US006155197A

United States Patent [19]

Stanley

[11] Patent Number: 6,155,197

[45] Date of Patent: Dec. 5, 2000

[54] RETRACTABLE FLAG HAND HELD UNIT

[76] Inventor: Wilbert T. Stanley, 7931 Echols Ave., Glen Arden, Md. 20706-1707

[21] Appl. No.: 09/282,932

[22] Filed: Apr. 1, 1999

[51] Int. Cl.$^{7}$ .................................................... G01F 17/00

[52] U.S. Cl. .............................. 116/173; 40/586; 40/610; 116/209

[58] Field of Search .................................. 116/28 R, 173, 116/174, 63 P, 209, 321; 40/218, 586, 610, 660; D11/166, 181

[56] References Cited

U.S. PATENT DOCUMENTS

| | | | |
|---|---|---|---|
| 1,305,885 | 6/1919 | Coe | 116/173 |
| 2,452,842 | 11/1948 | Davis | 116/173 |
| 3,237,592 | 3/1966 | Anderson | 116/173 |
| 3,678,456 | 7/1972 | Gruber | 340/472 |
| 3,762,704 | 10/1973 | Gingras | 482/81 |
| 4,055,840 | 10/1977 | Uchytil et al. | 340/321 |
| 4,744,869 | 5/1988 | Riksford | 84/477 B |
| 4,800,834 | 1/1989 | Feng | 116/173 |
| 4,896,623 | 1/1990 | Seibert et al. | 116/173 |
| 4,944,656 | 7/1990 | Feng et al. | 116/173 |
| 5,042,419 | 8/1991 | Bianco | 116/209 |
| 5,168,115 | 12/1992 | Hogrefe | 84/477 B |
| 5,343,825 | 9/1994 | Gazecimeon et al. | 116/173 |

*Primary Examiner*—Andrew H. Hirshfeld
*Assistant Examiner*—R. Alexander Smith

[57] ABSTRACT

A retractable flag hand held unit for permitting a user to selectively deploy a hand held flag to signal another. The retractable flag hand held unit includes a tubular housing with an opening therein at a distal end. A proximal end of an elongate rod is extended into the housing through the opening of the distal end of the housing. A back plate is disposed in the housing and coupled to the proximal end of the rod. The housing has a longitudinal slot in a side wall of the housing. A slide plate is disposed in the housing adjacent the longitudinal slot and is coupled to the back plate. A thumb slide has a slide extent extending through the longitudinal slot of the housing into the housing and which is coupled to the slide plate. A flag is coupled to the rod adjacent a distal end of the rod. The rod has a spaced apart plurality of constrictions adjacent the distal end of the rod. The rod comprises a resiliently flexible material so that the rod may be resiliently folded at each of the constrictions.

8 Claims, 2 Drawing Sheets

RETRACTABLE FLAG HAND HELD UNIT

BACKGROUND OF THE INVENTION

1. Field of the Invention

The present invention relates to retractable flag hand held units and more particularly pertains to a new retractable flag band held unit for permitting a user to selectively deploy a hand held flag to signal another.

2. Description of the Prior Art

The use of retractable flag hand held units is known in the prior art. More specifically, retractable flag hand held units heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,896,623; U.S. Pat. No. 4,574,726; U.S. Pat. No. 2,452,842; U.S. Pat. No. 5,168,115; U.S. Pat. No. 4,774,869; and U.S. Pat. No. Des. 271,190.

While these devices fulfill their respective, particular objectives and requirements, the aforementioned patents do not disclose a new retractable flag hand held unit. The inventive device includes a tubular housing with an opening therein at a distal end. A proximal end of an elongate rod is extended into the housing through the opening of the distal end of the housing. A back plate is disposed in the housing and coupled to the proximal end of the rod. The housing has a longitudinal slot in a side wall of the housing. A slide plate is disposed in the housing adjacent the longitudinal slot and is coupled to the back plate. A thumb slide has a slide extent extending through the longitudinal slot of the housing into the housing and which is coupled to the slide plate. A flag is coupled to the rod adjacent a distal end of the rod. The rod has a spaced apart plurality of constrictions adjacent the distal end of the rod. The rod comprises a resiliently flexible material so that the rod may be resiliently folded at each of the constrictions.

In these respects, the retractable flag hand held unit according to the present invention substantially departs from the conventional concepts and designs of the prior art, and in so doing provides an apparatus primarily developed for the purpose of permitting a user to selectively deploy a hand held flag to signal another.

SUMMARY OF THE INVENTION

In view of the foregoing disadvantages inherent in the known types of retractable flag hand held units now present in the prior art, the present invention provides a new retractable flag hand held unit construction wherein the same can be utilized for permitting a user to selectively deploy a hand held flag to signal another.

The general purpose of the present invention, which will be described subsequently in greater detail, is to provide a new retractable flag hand held unit apparatus and method which has many of the advantages of the retractable flag hand held units mentioned heretofore and many novel features that result in a new retractable flag hand held unit which is not anticipated, rendered obvious, suggested, or even implied by any of the prior art retractable flag hand held units, either alone or in any combination thereof.

To attain this, the present invention generally comprises a tubular housing with an opening therein at a distal end. A proximal end of an elongate rod is extended into the housing through the opening of the distal end of the housing. A back plate is disposed in the housing and coupled to the proximal end of the rod. The housing has a longitudinal slot in a side wall of the housing. A slide plate is disposed in the housing adjacent the longitudinal slot and is coupled to the back plate. A thumb slide has a slide extent extending through the longitudinal slot of the housing into the housing and which is coupled to the slide plate. A flag is coupled to the rod adjacent a distal end of the rod. The rod has a spaced apart plurality of constrictions adjacent the distal end of the rod. The rod comprises a resiliently flexible material so that the rod may be resiliently folded at each of the constrictions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new retractable flag hand held unit apparatus and method which has many of the advantages of the retractable flag hand held units mentioned heretofore and many novel features that result in a new retractable flag hand held unit which is not anticipated, rendered obvious, suggested, or even implied by any of the prior art retractable flag hand held units, either alone or in any combination thereof.

It is another object of the present invention to provide a new retractable flag hand held unit which may be easily and efficiently manufactured and marketed.

It is a further object of the present invention to provide a new retractable flag hand held unit which is of a durable and reliable construction.

An even further object of the present invention is to provide a new retractable flag hand held unit which is susceptible of a low cost of manufacture with regard to both materials and labor, and which accordingly is then susceptible of low prices of sale to the consuming public, thereby making such retractable flag hand held unit economically available to the buying public.

Still yet another object of the present invention is to provide a new retractable flag hand held unit which provides in the apparatuses and methods of the prior art some of the advantages thereof, while simultaneously overcoming some of the disadvantages normally associated therewith.

Still another object of the present invention is to provide a new retractable flag hand held unit for permitting a user to selectively deploy a hand held flag to signal another.

Yet another object of the present invention is to provide a new retractable flag hand held unit which includes a tubular housing with an opening therein at a distal end. A proximal end of an elongate rod is extended into the housing through the opening of the distal end of the housing. A back plate is disposed in the housing and coupled to the proximal end of the rod. The housing has a longitudinal slot in a side wall of the housing. A slide plate is disposed in the housing adjacent the longitudinal slot and is coupled to the back plate. A thumb slide has a slide extent extending through the longitudinal slot of the housing into the housing and which is coupled to the slide plate. A flag is coupled to the rod adjacent a distal end of the rod. The rod has a spaced apart plurality of constrictions adjacent the distal end of the rod. The rod comprises a resiliently flexible material so that the rod may be resiliently folded at each of the constrictions.

Still yet another object of the present invention is to provide a new retractable flag hand held unit that gives users a convenient way to hail cabs by waving the flag when extended and then permitting retraction of the flag once the user has hailed the cab.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
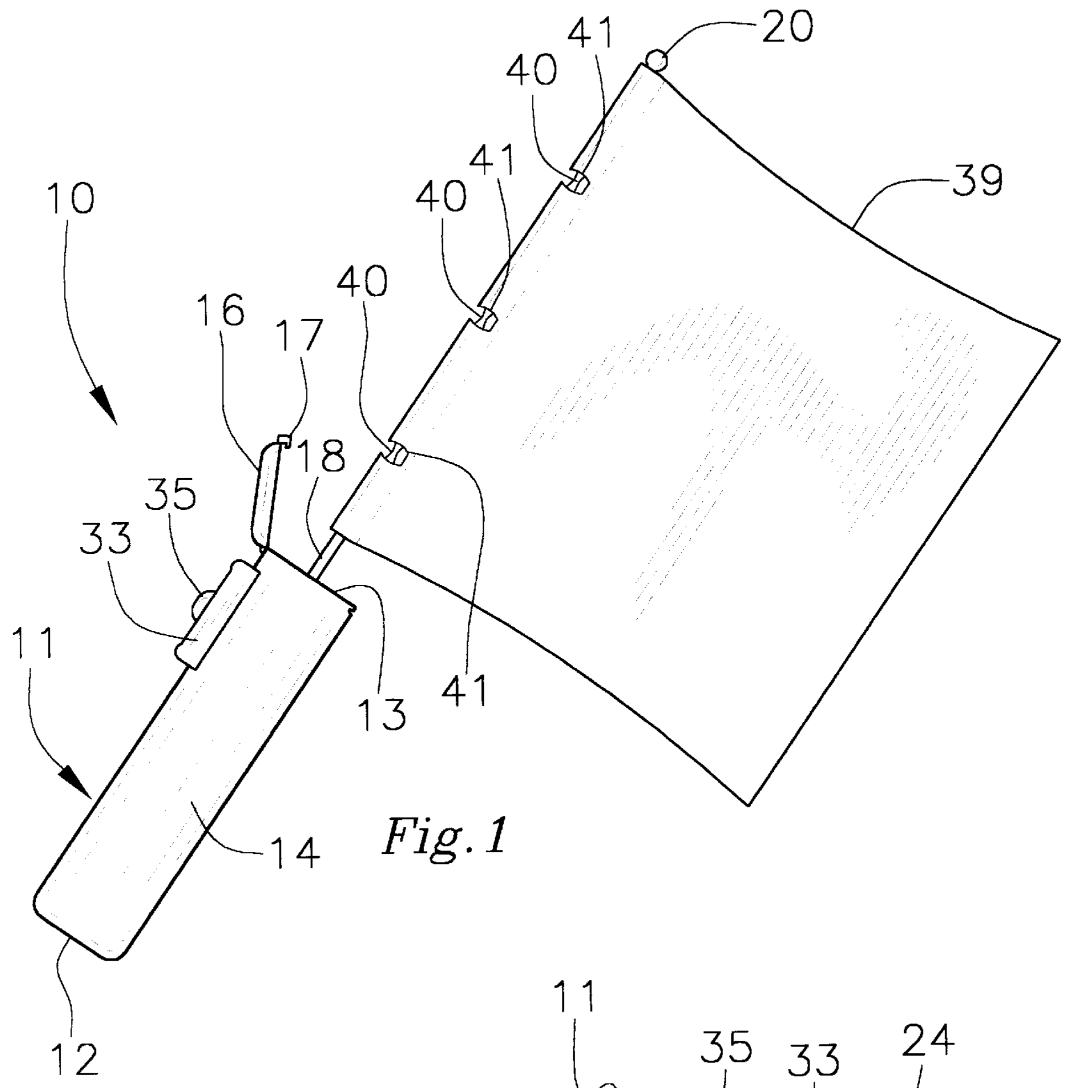
FIG. 1 is a side view of a new retractable flag hand held unit with the flag extended in an unfurled state according to the present invention.
Figure 2:
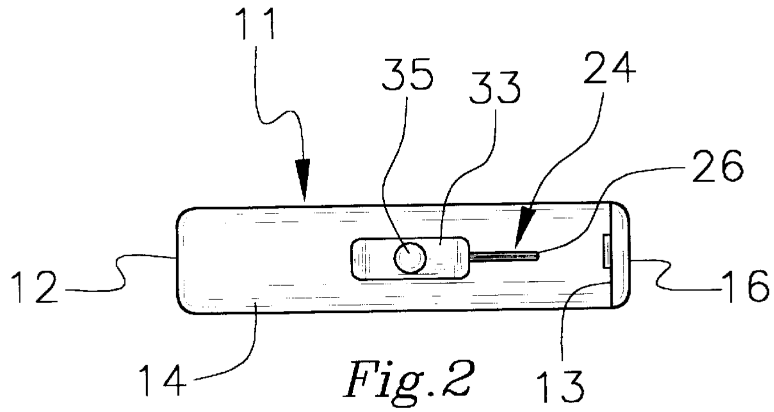
FIG. 2 is another side view of the present invention with the flag retracted into the housing.

With reference now to the drawings, and in particular to FIGS. 1 through 6 thereof, a new retractable flag hand held unit embodying the principles and concepts of the present invention and generally designated by the reference numeral 10 will be described.

As best illustrated in FIGS. 1 through 6, the retractable flag hand held unit 10 generally comprises a tubular housing with an opening therein at a distal end. A proximal end of an elongate rod is extended into the housing through the opening of the distal end of the housing. A back plate is disposed in the housing and coupled to the proximal end of the rod. The housing has a longitudinal slot in a side wall of the housing. A slide plate is disposed in the housing adjacent the longitudinal slot and is coupled to the back plate. A thumb slide has a slide extent extending through the longitudinal slot of the housing into the housing and which is coupled to the slide plate. A flag is coupled to the rod adjacent a distal end of the rod. The rod has a spaced apart plurality of constrictions adjacent the distal end of the rod. The rod comprises a resiliently flexible material so that the rod may be resiliently folded at each of the constrictions.

In closer detail, the retractable flag hand held unit 10 comprises a tubular housing 11 sized for fitting in a user's hand. The housing is generally cylindrical in shape and has opposite generally circular proximal and distal ends 12,13, a generally cylindrical side wall 14 and a longitudinal axis extending between the proximal and distal ends of the housing. The distal end of the housing has a generally circular opening 15 into the housing. The housing has a cap 16 for substantially covering the opening of the distal end of the housing, the cap is pivotally coupled to the distal end of the housing. Preferably, the housing has a latch 18 at the distal end of the housing for releasably holding the cap to the distal end of the housing when the cap is covering the opening of the distal end of the housing.

The unit also has an elongate rod 18 with opposite proximal and distal ends 19,20, a longitudinal axis extending between the proximal and distal ends of the rod, and a generally circular transverse cross section taken substantially perpendicular to the longitudinal axis of the rod. The proximal end of the rod is extended into the housing so that the distal end of the rod outwardly extends through the opening of the distal end of the housing. Preferably, the longitudinal axes of the rod and the housing are substantially coaxial with one another.

A generally disk shaped back plate 21 is slidably disposed in the housing between the proximal end of the housing and the proximal end of the rod. Preferably, the back plate lies in a plane extending substantially perpendicular to the longitudinal axes of the housing and rod. The proximal end of the rod is coupled to the back plate preferably by insertion into a generally cylindrical extent 22 outwardly extending from the back plate towards the distal end of the housing.

Preferably, a coiled compression spring 23 is disposed in the housing between the proximal end of the housing and the back plate. In use, the spring biases the back plate and the rod in a direction towards the distal end of the housing.

The housing has a longitudinal slot 24 through the side wall of the housing and preferably extending substantially parallel to the longitudinal axis of the housing. The longitudinal slot has opposite proximal and distal terminuses 25,26. The proximal terminus of the longitudinal slot is positioned towards the proximal end of the housing and the distal terminus of the longitudinal slot is positioned towards the distal end of the housing.

The longitudinal slot has a spaced apart pair of substantially parallel side edges 27,28 extending between the proximal and distal terminuses of the longitudinal slot. The longitudinal slot further has a generally circular portion 29 positioned towards and spaced apart from the proximal terminus of the longitudinal slot. The generally circular portion of the longitudinal slot has a pair of generally semi-circular regions. One of the generally semi-circular regions of the generally circular portion is outwardly extended from one of the side edges of the slot and the other of the generally semi-circular regions of the generally circular portion is outwardly extended from the other of the side edges of the slot. The circular portion of the longitudinal slot has a diameter greater than a width of the slot defined between the side edges of the slot.

A generally semi-cylindrical arcuate slide plate 30 is disposed in the housing between the back plate and the distal end of the housing. The slide plate abuts a portion of the interior of the housing adjacent the longitudinal slot of the housing. The slide plate has opposite proximal and distal edges 31,32. The proximal edge of the slide plate abuts and is coupled to the back plate.

The unit has a thumb slide 33 with a slide extent 34 extending through the longitudinal slot of the housing into the housing to permit sliding of the slide extent of the thumb slide along the length of the longitudinal slot between the proximal and distal terminuses of the longitudinal slot. The slide extent is coupled to the slide plate adjacent the distal end of the slide plate.

Figure 3:
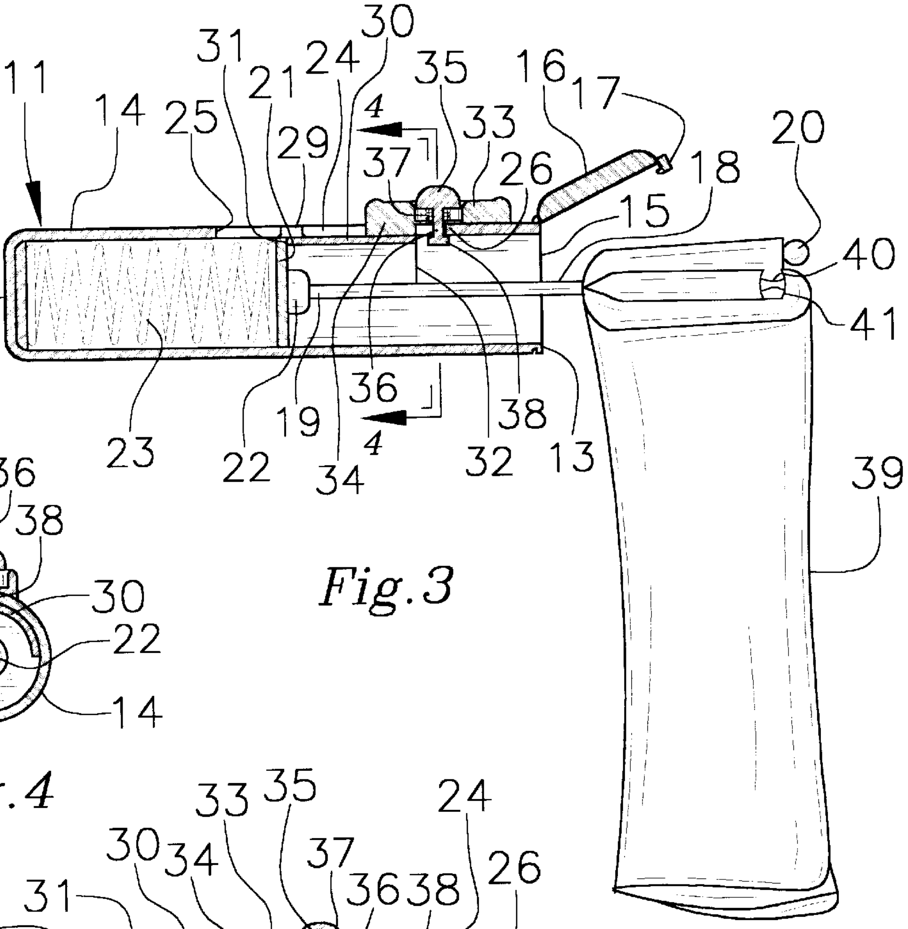
FIG. 3 is a schematic partial cross sectional view of the housing of the present invention with the rod folded at its distal end.
Figure 4:
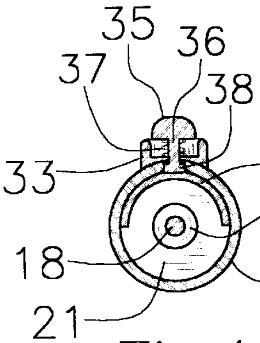
FIG. 4 is a schematic cross sectional view of the present invention taken from line 4—4 of FIG. 3.

In use, the slide extent of the thumb slide is slidable between a retracted position (FIG. 5) and an extended position (FIG. 3). The slide extent is positioned towards the proximal terminus of the longitudinal slot when the slide extent is positioned in the retracted position. The back plate is positioned towards the proximal end of the housing when the slide extent is positioned in the retracted position. With reference to FIG. 3, the slide extent is position towards the distal terminus of the longitudinal slot when the slide extent is positioned in the extended position. As the slide extent is moved from the retracted position towards the extended position, the back plate is moved in a direction towards the distal end of the housing.

Figure 5:
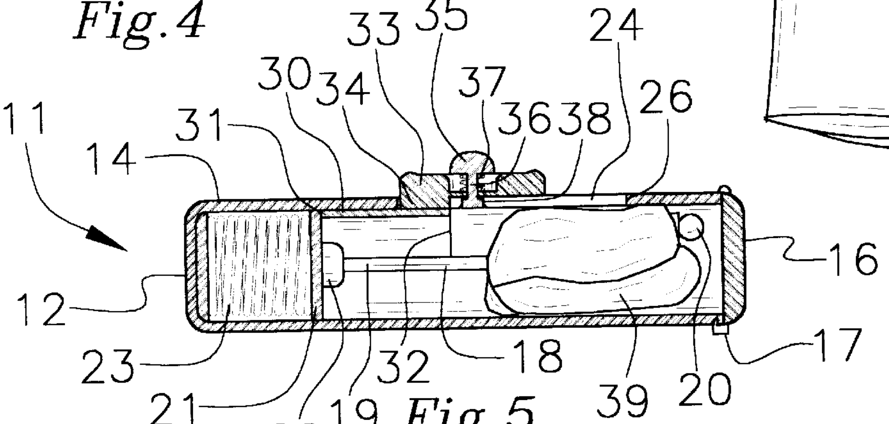
FIG. 5 is a schematic partial cross sectional view of the present invention with the flag folded and retracted into the housing.
Figure 6:
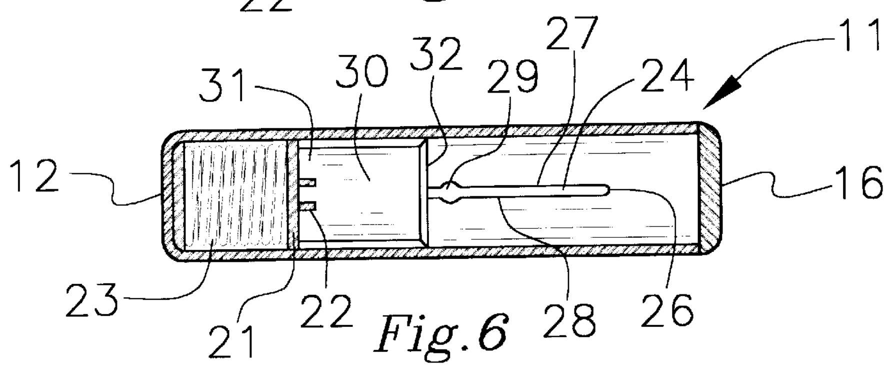
FIG. 6 is a schematic cross sectional view of the housing with the rod and flag removed.

The thumb slide has a slidable push button 35 has an inner extent 36 extending into the longitudinal slot. The thumb slide has a spring 37 biasing the inner extent of the push button in an outwards direction out of the longitudinal slot of the housing. The inner extent of the push button has a disk shaped end flange 38 with a diameter greater than the width of the longitudinal slot and less than the diameter of the circular portion of the longitudinal slot. In use, the lower extent is extended through the circular portion of the longitudinal slot when the slide extent of the thumb slide is positioned in the retracted position as best illustrated in FIG. 5. In this position, the spring of the thumb slide biases the end flange upwards into the circular portion of the longitudinal slot when the slide extent of the thumb slide is in the retracted position to prevent sliding of the slide extent along the longitudinal slot until a user pushes the push button to push the end flange out of the circular portion and into the housing.

A flag 39 is coupled to the rod adjacent the distal end of the rod. The rod has a spaced apart plurality of resilient constrictions 40 adjacent the distal end of the rod. The rod comprises a resiliently flexible material whereby the rod may be resiliently folded at each of the constrictions (as shown in FIGS. 3 and 5) in such a way that if the user lets go of the folded portions the resilient nature of the rod unfolds the rod back into a linear state. Preferably, the flag has a plurality of cutouts 41. Each of the constrictions of the rod is position in an associated cutout of the flag.

In use, after folding of the portion of the rod adjacent the distal end, the flag may be rolled around the folded up portion of the rod as shown in FIG. 3. As the thumb slide is slid to the retracted position, the folded up portion of the rod and rolled up flag are slid through the opening of the distal end of the housing into the housing (as illustrated in FIG. 5) so that the cap may be closed.

To deploy the flag from the state illustrated in FIG. 5, a user unlatches the latch to open the opening of the distal end of the housing. The user than depresses the push button to permit sliding of the thumb slide and the connected components to the extended position where the folded portion of the rod is then extended out of the housing. This allows the user to unwrap the flag from around the folded portion of the rod and this allows the resiliency of the rod to unfold the rod to a linear state with the flag fully unfurled (as illustrated in FIG. 1) so that the user may wave the flag to attract attention to another.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retractable flag unit, comprising:

a tubular housing having proximal and distal ends, a side wall and a longitudinal axis extending between said proximal and distal ends of said housing;

said distal end of said housing having an opening into said housing;

an elongate rod having opposite proximal and distal ends, a longitudinal axis extending between said proximal and distal ends of said rod;

said proximal end of said rod being extended into said housing, said distal end of said rod being outwardly extended through said opening of said distal end of said housing;

a back plate being disposed in said housing and coupled to said proximal end of said rod;

said housing having a longitudinal slot through said side wall of said housing;

a slide plate being disposed in said housing adjacent said longitudinal slot and being coupled to said back plate;

said slide plate having opposite proximal and distal edges, said proximal edge of said slide plate abutting and being coupled to said back plate;

a thumb slide having a slide extent extending through said longitudinal slot of said housing into said housing;

said slide extent being coupled to said slide plate;

a flag being coupled to said rod adjacent said distal end of said rod; and said rod having a spaced apart plurality of constrictions adjacent said distal end of said rod, said rod comprising a resiliently flexible material whereby said rod resiliently folds at each of said constrictions.

2. The retractable flag unit of claim 1, further comprising a cap for substantially covering said opening of said distal end of said housing, said cap being pivotally coupled to said distal end of said housing.

3. The retractable flag unit of claim 2, wherein said housing has a latch at said distal end of said housing for releasably holding said cap to said distal end of said housing when said cap is covering said opening of said distal end of said housing.

4. The retractable flag unit of claim 1, wherein said back plate is biased in a direction towards said distal end of said housing.

5. The retractable flag unit of claim 4, wherein a spring disposed in said housing between said proximal end of said housing and said back plate biases said back plate in the direction towards said distal end of said housing.

6. The retractable flag unit of claim 1, wherein said longitudinal slot has a generally circular portion, wherein said thumb slide has a slidable push button having an inner extent extending into said longitudinal slot, said thumb slide having a spring biasing said inner extent of said push button in an outwards direction out of said longitudinal slot of said housing, said inner extent of said push button having a disk shaped end flange having a diameter greater than a width of said longitudinal slot and less than a diameter of said circular portion of said longitudinal slot.

7. The retractable flag unit of claim 1, wherein said flag has a plurality of cutouts, each of said constrictions of said rod being positioned in an associated cutout of said flag.

8. A retractable flag unit, comprising:

a tubular housing being generally cylindrical in shape and having opposite generally circular proximal and distal ends, a generally cylindrical side wall and a longitudinal axis extending between said proximal and distal ends of said housing;

said distal end of said housing having a generally circular opening into said housing;

said housing having a cap for substantially covering said opening of said distal end of said housing, said cap being pivotally coupled to said distal end of said housing;

said housing having a latch at said distal end of said housing for releasably holding said cap to said distal end of said housing when said cap is covering said opening of said distal end of said housing;

an elongate rod having opposite proximal and distal ends, a longitudinal axis extending between said proximal and distal ends of said rod, and a generally circular transverse cross section taken substantially perpendicular to said longitudinal axis of said rod;

said proximal end of said rod being extended into said housing, said distal end of said rod being outwardly extended through said opening of said distal end of said housing;

said longitudinal axes of said rod and said housing being substantially coaxial with one another;

a generally disk shaped back plate being slidably disposed in said housing between said proximal end of said housing and said proximal end of said rod, said back plate lying in a plane extending substantially perpendicular to said longitudinal axes of said housing and rod;

said proximal end of said rod being coupled to said back plate, wherein said back plate has a generally cylindrical extent extending towards said distal end of said housing, said proximal end of said rod being inserted into said extent of said back plate to couple said proximal end of said rod to said back plate;

a spring being disposed in said housing between said proximal end of said housing and said back plate, said spring biasing said back plate and said rod in a direction towards said distal end of said housing;

said housing having a longitudinal slot through said side wall of said housing and extending substantially parallel to said longitudinal axis of said housing;

said longitudinal slot having opposite proximal and distal terminuses, said proximal terminus of said longitudinal slot being positioned towards said proximal end of said housing and said distal terminus of said longitudinal slot being positioned towards said distal end of said housing;

said longitudinal slot having a spaced apart pair of substantially parallel side edges extending between said proximal and distal terminuses of said longitudinal slot;

said longitudinal slot having a generally circular portion positioned towards said proximal terminus of said longitudinal slot;

said generally circular portion of said longitudinal slot having a pair of generally semi-circular regions, one of said generally semi-circular regions of said generally circular portion being outwardly extended from one of said side edges of said slot and the other of said generally semi-circular regions of said generally circular portion being outwardly extended from the other of said side edges of said slot;

said circular portion of said longitudinal slot having a diameter greater than a width of said slot defined between said side edges of said slot;

a generally semi-cylindrical arcuate slide plate being disposed in said housing between said back plate and said distal end of said housing, said slide plate abutting a portion of said housing adjacent said longitudinal slot of said housing;

said slide plate having opposite proximal and distal edges, said proximal edge of said slide plate abutting and being coupled to said back plate;

a thumb slide having a slide extent extending through said longitudinal slot of said housing into said housing to permit sliding of said slide extent of said thumb slide along said longitudinal slot between said proximal and distal terminuses of said longitudinal slot;

said slide extent being coupled to said slide plate adjacent said distal end of said slide plate;

said slide extent of said thumb slide being slidable between a retracted position and an extended position;

said slide extent being positioned towards said proximal terminus of said longitudinal slot when said slide extent is positioned in said retracted position, said back plate being positioned towards said proximal end of said housing when said slide extent is positioned in said retracted position, said back plate being moved in a direction towards said distal end of said housing as said slide extent is moved from said retracted position towards said extended position;

said thumb slide having a slidable push button having an inner extent extending into said longitudinal slot, said thumb slide having a spring biasing said inner extent of said push button in an outwards direction out of said longitudinal slot of said housing, said inner extent of said push button having a disk shaped end flange having a diameter greater than said width of said longitudinal slot and less than said diameter of said circular portion of said longitudinal slot;

wherein said inner extent is extended through said circular portion of said longitudinal slot when said slide extent of said thumb slide is positioned in said retracted position, said spring of said thumb slide biasing said end flange upwards into said circular portion of said longitudinal slot when said slide extent of said thumb slide is in said retracted position to prevent sliding of said slide extent along said longitudinal slot;

a flag being coupled to said rod adjacent said distal end of said rod;

said rod having a spaced apart plurality of constrictions adjacent said distal end of said rod, said rod comprising a resiliently flexible material whereby said rod folds at each of said constrictions; and said flag having a plurality of cutouts, each of said constrictions of said rod being positioned in an associated cutout of said flag.

* * * * *